United States Patent
Madau

(10) Patent No.: US 6,593,856 B1
(45) Date of Patent: Jul. 15, 2003

(54) HOMEBOUND/OUTBOUND FEATURE FOR AUTOMOTIVE APPLICATIONS

(75) Inventor: Adrian Madau, Dearborn, MI (US)

(73) Assignee: Visteon Global Technologies Inc., Dearborn, MI (US)

( * ) Notice: Subject to any disclaimer, the term of this patent is extended or adjusted under 35 U.S.C. 154(b) by 0 days.

(21) Appl. No.: 09/478,656

(22) Filed: Jan. 6, 2000

(51) Int. Cl.[7] .................. G08C 19/00; B60R 25/00; G05B 19/00; G06F 7/04; G08B 29/00

(52) U.S. Cl. .................. 340/825.69; 340/5.71

(58) Field of Search .................. 340/3.63, 5.31, 340/5.61, 5.71, 5.73, 825.72, 825.74, 825.69, 545.1, 505, 546, 516, 523, 5.28, 540

(56) References Cited

U.S. PATENT DOCUMENTS

| | | | |
|---|---|---|---|
| 4,464,651 A | * 8/1984 | Duhame | 340/521 |
| 4,929,877 A | * 5/1990 | Clark et al. | 318/560 |
| 5,537,104 A | 7/1996 | Van Dort et al. | |
| 5,541,585 A | * 7/1996 | Duhame et al. | 340/825.69 |
| 5,544,036 A | 8/1996 | Brown, Jr. et al. | |
| 5,552,789 A | * 9/1996 | Schuermann | 342/42 |
| 5,565,843 A | 10/1996 | Mayvis | |
| 5,701,580 A | 12/1997 | Yamane et al. | |
| 5,761,083 A | 6/1998 | Brown, Jr. et al. | |
| 5,793,300 A | 8/1998 | Suman et al. | |
| 5,877,957 A | 3/1999 | Bennett | |
| 5,986,543 A | * 11/1999 | Johnson | 340/426 |
| 6,002,332 A | * 12/1999 | King | 340/545.1 |
| 6,388,559 B1 | * 5/2002 | Cohen | 340/5.71 |

* cited by examiner

Primary Examiner—Michael Horabik
Assistant Examiner—Nam V Nguyen
(74) Attorney, Agent, or Firm—MacMillan, Sobanski & Todd, LLC

(57) ABSTRACT

A homebound/outbound feature for automotive applications including home automation system (12), a home (14) and an automobile (16). The home automation system (12) having a homebound setting (18) and an outbound setting (20). A homebound control element (22) and an outbound control element (24) are positioned within the automobile (16) and are used to activate the homebound setting (18) and the outbound setting (20) respectively. A display element (26) positioned within the automobile (16) is used to apprise the homeowner of the status of the home automation system's (12) settings. This convenient, flexible and simplistic method of user interface improves the safety of the homeowner.

20 Claims, 1 Drawing Sheet

HOMEBOUND/OUTBOUND FEATURE FOR AUTOMOTIVE APPLICATIONS

TECHNICAL FIELD

The present invention relates generally to communication between an automotive vehicle and a home and more particularly to communication between an automotive vehicle and a home that is based upon the vehicle being outbound or homebound.

BACKGROUND ART

Home automation systems are well known within the art. These systems provide programmable control over devices such as home security systems, environmental control systems, water heaters, lighting and other appliances. It is known that such home automation systems may be used to start, stop, or alter the operation of such devices at scheduled times throughout a daily, weekly, or monthly schedule. It is known that the status or schedule of such devices may be altered through a user interface or programmable controller located within the house. Human beings, however, by their nature do not live their lives by rigid schedules. Therefore, interaction with the user interface may be required frequently. In addition, it is preferable to have user interfaces that are as convenient and simplistic as possible. It would be desirable, therefore, to have a user interface for such home automation systems that accommodates the erratic schedules of normal life while providing as convenient and simplistic an interface as possible.

One known convenient and simplistic interface that accommodates differing schedules is an electrically powered garage door opener. They are commonly remotely actuated by means of a radio frequency transmitter. The control signal typically has a carrier frequency and a control code such that the garage door opening mechanism will only respond to the associated remote control. Systems are also known that control lights or household appliances by use of a radio frequency control system. It is known that such systems may be combined such that a single remote control may be used to activate the electrically powered garage door as well as activate lights or other household appliances. These systems, although simplistic and convenient, do not provide the range of control present in known home automation system interfaces. In addition, the limited control they provide is premised upon the presence of an electric garage door opener. It would be highly desirable to have a device that retained the convenience and simplicity of known electric garage door opener remote controls while providing the range of control provided by home automation system interfaces. In addition, it would be desirable for such a device to work independently of the existence of an electric garage door.

SUMMARY OF THE INVENTION

It is therefore an object of the present invention to provide an interface for a home automation system that provides simplicity of use similar to remote garage door openers while additionally providing the range of control found in known home automation system interfaces.

In accordance with the objects of this invention a homebound/outbound feature for automotive applications is provided. The homebound/outbound feature includes an outbound control element and a homebound control element that are positioned within an automobile. Both the outbound control element and the homebound control element have an active setting and an inactive setting.

When the outbound control element is in its active setting a signal is sent from the automobile to a home automation system. The signal sent to the home automation system activates an outbound setting within the home automation system. When the homebound control element is in its active setting a signal is sent from the automobile to the home automation system that activates a homebound setting within the home automation system.

The homebound/outbound feature further includes a display element positioned within the automobile. The display element is in communication with the home automation system. The display element displays the status of settings within the home automation system.

Other objects and features of the present invention will become apparent when viewed in light of the detailed description of the preferred embodiment when taken in conjunction with the attached drawings and appended claims.

DESCRIPTION OF THE PREFERRED EMBODIMENT(S)

Figure 2:
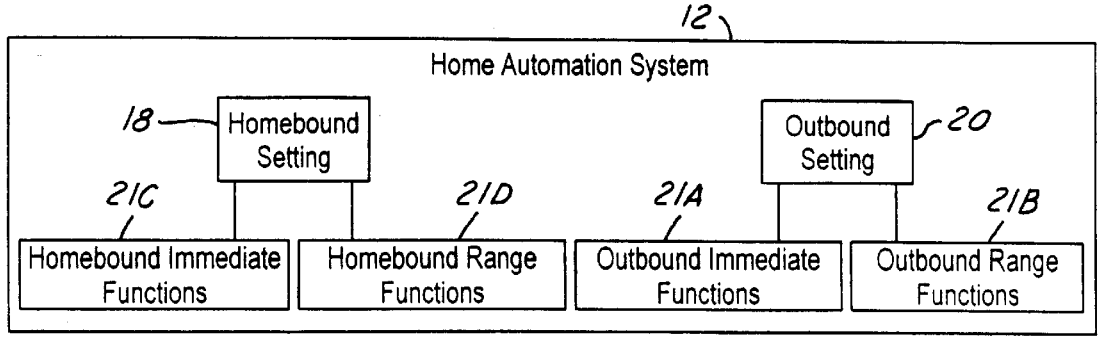
FIG. 2 is a block diagram of a home automation system of the present invention.
Figure 1:
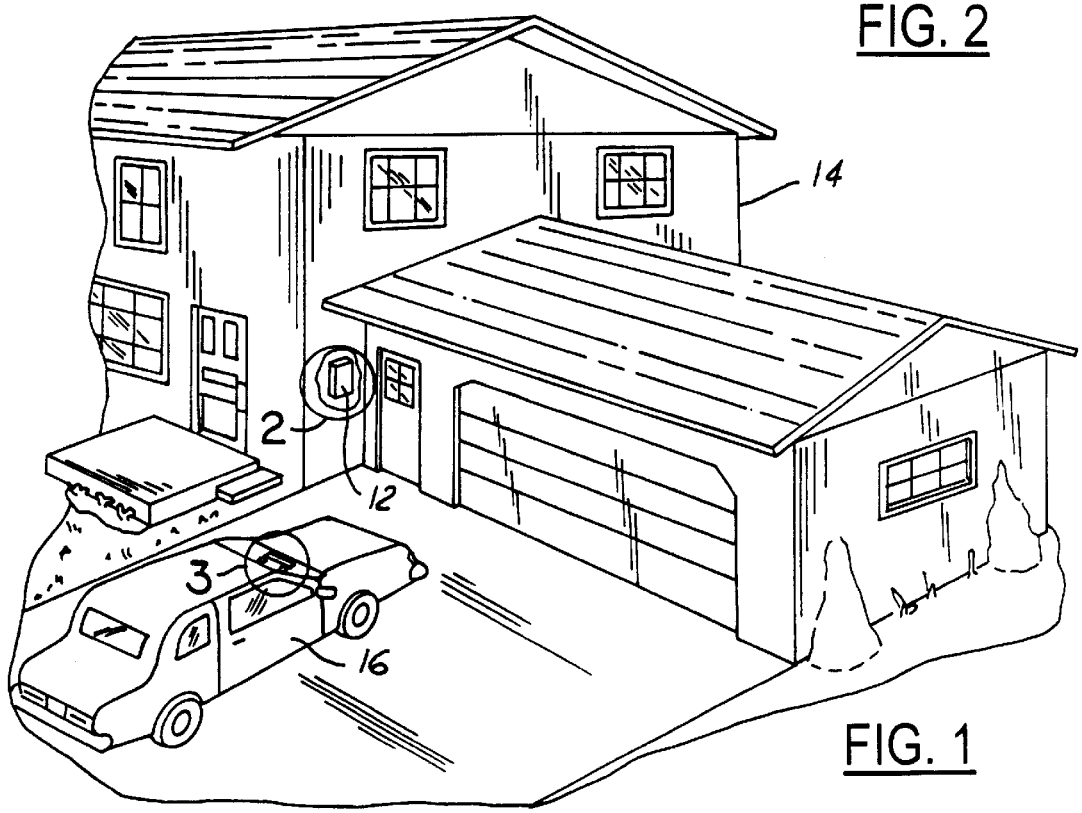
FIG. 1 is an illustration of an embodiment of a homebound/outbound feature for automobile applications in accordance with the present invention.
Figure 3:
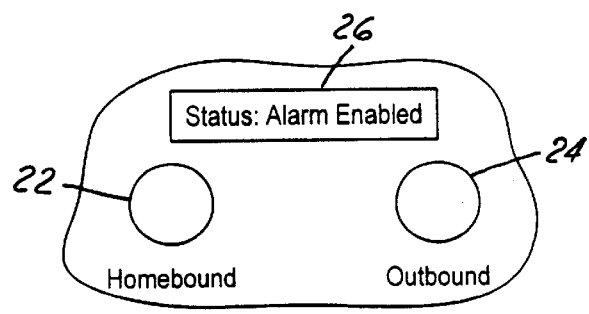
FIG. 3 is an illustration of control elements and a display element in an automobile according to the present invention.

Referring now to FIG. 1, which is an illustration of an embodiment of a homebound/outbound feature for automobile applications in accordance with the present invention. The homebound/outbound feature comprises a home automation system 12, positioned within a home 14, and an automobile 16. Although the present home automation system 12 may be described with particular attributes in this disclosure, a variety of known control functions by the home automation system may be used.

The home automation system 12 comprises a homebound setting 18 and an outbound setting 20. The home automation system 12 may include additional settings in combination with these. The outbound setting 20 is a setting within the home automation systems 12 designed to include a variety of functions that a homeowner may desire to implement within the home automation system 12 upon his leaving the home 14. These functions may include, but are not limited to, turning down the heat or switching off air-conditioning in an environmental control system to conserve electricity, activating a home security system, activating a light timer to give the appearance of someone in the home, and switching off appliances that may pose a danger if left unattended such as irons and stoves.

In another embodiment, the functions of the outbound setting 20 can be split into outbound immediate functions 21A and outbound range functions 21B. Outbound immediate functions 21A are functions within the outbound setting 20 that are implemented instantly when the outbound setting 20 is initiated. Outbound range functions 21B are functions that are implemented based on the distance of the automobile 16 from the home 14. This embodiment allows the homeowner to have certain functions activated immediately such as a home security system, and other functions such as closing an electric garage door only when the automobile 16 reaches a specified distance from the home 14. In a different embodiment, the outbound range functions 21B can be implemented based on a time delay rather than the distance of the automobile 16 from the home 14. The time delay or distance controlling the outbound range functions 21B can be varied. It should be understood, however, that the outbound setting 20 need not be split into outbound immediate functions 21A and outbound range functions 21B and that all functions can be initiated simultaneously.

The homebound setting 18 is a setting within the home automation systems 12 designed to include a variety of functions that the homeowner may desire to implement within the home automation system 12 upon his arrival to the home 14. These functions may include, but are not limited to, raising the heat or switching on air-conditioning in an environmental control system, deactivating a home security system, deactivating a light timer, activating entry lights, and switching on appliances. The functions of both settings may be adjusted to accomplish a wide variety of tasks and to satisfy a wide variety of homeowner preferences. The functions of the homebound setting 18 need not directly compliment the functions of the outbound setting 20.

In another embodiment, the functions of the homebound setting 18 can be split into homebound immediate functions 21C and homebound range functions 21D. Homebound immediate functions 21C are functions within the homebound setting 18 that are implemented instantly when the homebound setting 18 is initiated. Homebound range functions 21D are functions that are implemented based on the distance of the automobile 16 from the home 14. This embodiment allows the homeowner to have certain functions activated immediately such as environmental controls, and other functions such as opening an electric garage door or deactivating a security system only when the automobile 16 reaches a specified distance from the home 14. In a different embodiment, the homebound range functions 21D can be implemented based on a time delay rather than the distance of the automobile 16 from the home 14. The time delay or distance controlling the homebound range functions 21D can be varied. It should be understood, however, that the homebound setting 18 need not be split into homebound immediate functions 21C and homebound range functions 21D.

The homebound setting 18 and the outbound setting 20, can be activated through the use of a homebound control element 22 and an outbound control element 24 both positioned within the automobile 16. By pairing the homebound setting 18 and the outbound setting 20 in the home automation system 12 with a respective corresponding homebound control element 22 and outbound control element 24 positioned within the automobile 16, a series of complex tasks can be performed through the access of a single element within the automobile 16. In one embodiment, the homebound control element 22 and the outbound control element 24 are buttons. In this embodiment, the homeowner need only press a single button to accomplish a complex set of tasks upon leaving or returning to his home 14. By locating the button within the automobile 16, a convenient and simplistic interface is provided to accomplish those tasks.

In another embodiment the homebound control element 22 and the outbound control element 24 are activated by voice activation. In this embodiment, the homeowner can accomplish the same tasks by merely speaking. Although these two embodiments have been described, a variety of methods of activating these elements are known. By placing activation of the homebound control element 22 and the outbound control element 24 within the control of the homeowner as he leaves his home 14, the system accommodates the random nature of human life. If the homeowner wishes only to run to the store or if there are others still at home, the homeowner need not activate either of the settings.

In addition to the convenience and simplicity of activation, this invention includes further benefits. The homebound/outbound feature may also include a display element 26 positioned within the automobile 16. The display element 26 is in communication with the home automation system 12. By using the display element 26 to display the status of the home automation system 12, further convenience is provided to the homeowner. The display element 26 can be used to display the status of the individual settings within the home automation system 12. If a home security system indicates a window within the home 14 is open, the display element 26 can reflect that to the homeowner so that he can adequately secure the house. In addition, upon return to the home 14, if the security system indicates a break in has occurred, this information can be displayed to the homeowner before he enters the home 14 thus providing increased safety to the homeowner. Although the display element 26 has been described in relationship to a security system function, a variety of functions within the home automation system 12 can be communicated to the homeowner through the display element 26.

In an alternate embodiment the homebound control element 22 and the outbound control element 24 have the capability of bypassing individual functions within the respective homebound setting 18 and outbound setting 20. In this embodiment, if the display element 26 indicates a warning or setting problem with one of the functions, the user can bypass that function. This is especially useful where a security system may contact a security service if a window is left open and the security system is activated. A homeowner using this embodiment would be able to bypass the window alarm on the security system such that the security system could remain active without notifying the security service. Although this feature is described in relationship to a security system, a variety of other functions and settings could be bypassed.

The homebound/outbound feature provides the complexity of control found in home automation systems with the convenience, flexibility and simplicity of control typically found only in relatively simplistic devices such as garage door openers. In addition, when combined with the display element 26, the homebound/outbound feature provides additional convenience and safety to the homeowner.

While particular embodiments of the invention have been shown and described, numerous variations and alternate embodiments will occur to those skilled in the art. Accordingly, it is intended that the invention be limited only in terms of the appended claims.

What is claimed is:

1. A system of communication between a vehicle driver and the driver's home, comprising:
   an automobile;
   a home automation system having an outbound setting and a homebound setting, wherein said outbound setting comprises a first function of said home automation system to be implemented only upon said driver leaving said home, and wherein said homebound setting comprises a second function of said home automation system to be implemented only upon said driver arriving at said home;
   an outbound control element, positioned within said automobile, said outbound control element having an active setting and an inactive setting, when said outbound control element is in said activate setting, said outbound control element communicates with said home automation system to activate said outbound setting; and a homebound control element, positioned within said automobile, said homebound control element having an active setting and an inactive setting, when said homebound control element is in said activate setting, said homebound control element communicates with said home automation system to activate said homebound setting.

2. A system of communication as described in claim 1, wherein said outbound control element and said homebound control element are activated through the use of a button mechanism.

3. A system of communication as described in claim 1, wherein said outbound control element and said homebound control element are activated through the use of a voice activated mechanism.

4. A system of communication as described in claim 1, wherein said outbound setting activates a home security system.

5. A system of communication as described in claim 1, wherein said outbound setting disables power to a household appliance.

6. A system of communication as described in claim 1, wherein said outbound setting adjusts the temperature of an environmental control system.

7. A system of communication as described in claim 1, wherein said homebound setting deactivates a home security system.

8. A system of communication as described in claim 1, wherein said homebound setting adjusts the temperature of an environmental control system.

9. A system of communication as described in claim 1, wherein said homebound setting comprises at least one function and said homebound control element is capable of bypassing said at least one function of said homebound setting.

10. A system of communication as described in claim 1, wherein said outbound setting comprises at least one function and said outbound control element is capable of bypassing said at least one function of said outbound setting.

11. A system of communication as described in claim 1, further comprising a display element, positioned within said automobile, said display element in communication with said home automation system.

12. A system of communication as described in claim 11, wherein said home automation system comprises a plurality of settings, and wherein said display element displays the status of said plurality of settings.

13. A system of communication as described in claim 11, wherein said home automation system comprises a plurality of warnings, and wherein said display element displays the status of said plurality of warnings.

14. A system of communication between a vehicle driver and the driver's home, comprising:

an automobile;

a home automation system having a outbound setting and a homebound setting, said outbound setting comprised of outbound immediate functions and outbound range functions to be implemented only upon said driver leaving said home, said homebound setting comprised of homebound immediate functions and homebound range functions to be implemented only upon said driver arriving at said home;

an outbound control element, positioned within said automobile, said outbound control element having an active setting and an inactive setting, when said outbound control element is in said activate setting, said outbound control element communicates with said home automation system to activate said outbound setting; and a homebound control element, positioned within said automobile, said homebound control element having an active setting and an inactive setting, when said homebound control element is in said activate setting, said homebound control element communicates with said home automation system to activate said homebound setting.

15. A system of communication as described in claim 14, wherein said outbound immediate functions are implemented generally immediately after said outbound control element is activated.

16. A system of communication as described in claim 14, wherein the implementation of said outbound range functions is dependent upon the distance between said automobile and said home automation system.

17. A system of communication as described in claim 14, wherein said homebound immediate functions are implemented generally immediately after said homebound control element is activated.

18. A system of communication as described in claim 14, wherein the implementation of said homebound range functions is dependent upon the distance between said automobile and said home automation system.

19. A method of communication between an automobile and a home automation system, comprising the steps of:

activating an element within an automobile to indicate if the automobile is homebound or outbound;

sending a signal to the home automation system from the automobile indicating said homebound or outbound status; and activating a setting in the home automation system, said setting being either a homebound setting or an outbound setting.

20. A method of communication as described in claim 19, further comprising the step of:

communicating the status of said home automation system to said automobile; and displaying said status on a display element positioned within said automobile.

\* \* \* \* \*